United States Patent
McDuff et al.

(10) Patent No.: US 10,900,512 B2
(45) Date of Patent: *Jan. 26, 2021

(54) ANCHOR FOR HOLLOW WALLS

(71) Applicant: COBRA FIXATIONS CIE LTEE—COBRA ANCHORS CO. LTD., Montreal (CA)

(72) Inventors: Pierre McDuff, Outremont (CA); Richard Labelle, La Gardeur (CA); William A. Crossley, Goshen, NY (US); Lang Nguyen, Dollard-des-Orneaux (CA); Michel Villagrasa, St-Hubert (CA); Andre Bouchard, Montreal (CA)

(73) Assignee: COBRA FIXATIONS CIE LTEE—COBRA ANCHORS CO. LTD., Montreal (CA)

( * ) Notice: Subject to any disclaimer, the term of this patent is extended or adjusted under 35 U.S.C. 154(b) by 1 day.

This patent is subject to a terminal disclaimer.

(21) Appl. No.: 15/167,524

(22) Filed: May 27, 2016

(65) Prior Publication Data
US 2017/0051772 A1 Feb. 23, 2017

Related U.S. Application Data

(60) Continuation of application No. 12/693,976, filed on Jan. 26, 2010, now Pat. No. 9,353,782, which is a
(Continued)

(30) Foreign Application Priority Data

Dec. 11, 2002 (CA) ...................................... 2414436

(51) Int. Cl.
*F16B 13/06* (2006.01)
*F16B 13/00* (2006.01)

(52) U.S. Cl.
CPC .......... *F16B 13/061* (2013.01); *F16B 13/002* (2013.01)

(58) Field of Classification Search
CPC .... F16B 13/002; F16B 13/061; F16B 13/045; F16B 13/001
(Continued)

(56) References Cited

U.S. PATENT DOCUMENTS 2,236,079 A 3/1941 Wipper
2,913,853 A 11/1959 Solem
(Continued)

FOREIGN PATENT DOCUMENTS

DE 3631581 1/1988
DE 19720406 10/1998
(Continued)

*Primary Examiner* — Flemming Saether
(74) *Attorney, Agent, or Firm* — Shutts & Bowen LLP

(57) ABSTRACT

An anchor (910) for mounting to a hollow wall (W) made of friable material comprises a proximal flanged end (918) adapted to be engaged by a rotatable tool (B) to rotate the anchor (910) about a longitudinal axis (A) thereof and to cause is to gradually engage the wall (W). The anchor (910) also includes a distal end (912) adapted to cut through the wall (W) as the anchor (910) is rotated, and a shank (920) extending between the proximal and distal ends (918, 912). The shank (920) includes at least one expandable leg (924) that is in a collapsed position thereof when the anchor (910) is rotated to mount it to the wall (W) and that is located distally beyond a non visible surface of the wall (W) once the anchor (910) has been mounted to the wall and is in a first position thereof. The wall anchor (910) includes an outer thread (922) that securely engages the wall (W). A threaded fastener (B), e.g. a screw, is adapted to be introduced in the anchor (910) and to threadably engage the same distally of the leg (924) such that sufficient rotation of the threaded fastener (B) retracts the distal end (912) towards
(Continued)

the proximal end (918) thereby causing the leg (924) to displace to a laterally expanded position thereof and to engage the non visible surface of the wall (W).

20 Claims, 14 Drawing Sheets

Related U.S. Application Data division of application No. 10/538,451, filed as application No. PCT/CA03/02041 on Dec. 11, 2003, now Pat. No. 7,654,781.

(60) Provisional application No. 60/435,369, filed on Dec. 23, 2002.

(58) Field of Classification Search
USPC .................. 411/29, 34, 38, 387.1, 80.1–80.5
See application file for complete search history.

(56) References Cited

U.S. PATENT DOCUMENTS

| | | | |
|---|---|---|---|
| 3,213,746 A | 10/1965 | Dwyer | |
| 3,365,999 A | 1/1968 | Perlin | |
| 3,385,156 A | 5/1968 | Polos | |
| 3,548,705 A | 12/1970 | Nasser | |
| 3,789,727 A * | 2/1974 | Moran | F16B 13/061 411/38 |
| 3,832,931 A | 9/1974 | Talan | |
| 3,911,781 A * | 10/1975 | Bappert | F16B 13/02 411/418 |
| 3,937,122 A | 2/1976 | Riedel | |
| 4,085,337 A * | 4/1978 | Moeller | B21J 15/048 173/205 |
| 4,601,625 A | 7/1986 | Ernst et al. | |
| 4,617,692 A | 10/1986 | Bond et al. | |
| 4,822,270 A | 4/1989 | Bonissone et al. | |
| 4,861,206 A * | 8/1989 | Riedel | F16B 13/02 411/36 |
| 5,190,425 A * | 3/1993 | Wieder | F16B 13/002 411/29 |
| 5,234,299 A | 8/1993 | Giannuzzi | |
| 5,250,865 A | 10/1993 | Meeks | |
| 5,380,135 A | 1/1995 | Anquetin | |
| 5,529,449 A | 6/1996 | McSherry et al. | |
| 5,690,454 A * | 11/1997 | Smith | F16B 13/002 411/30 |
| 5,692,864 A * | 12/1997 | Powell | F16B 13/002 411/30 |
| 5,833,415 A | 11/1998 | McSherry | |
| 5,969,220 A | 10/1999 | Peters | |
| 6,139,236 A * | 10/2000 | Ito | F16B 13/002 408/223 |
| 6,186,716 B1 * | 2/2001 | West | F16B 13/002 411/30 |
| 6,196,780 B1 * | 3/2001 | Wakai | F16B 13/002 411/21 |
| 6,435,789 B2 | 8/2002 | Gaudron | |
| 6,609,866 B2 | 8/2003 | Huang et al. | |
| 7,261,505 B2 * | 8/2007 | Ernst | F16B 13/002 411/29 |
| 7,654,781 B2 | 2/2010 | McDuff et al. | |
| 10,294,975 B2 | 5/2019 | McDuff et al. | |
| 10,344,789 B2 | 7/2019 | Daykin | |
| 2006/0067803 A1 * | 3/2006 | Hsu | F16B 13/003 411/29 |
| 2006/0072979 A1 | 4/2006 | McDuff et al. | |
| 2006/0222474 A1 | 10/2006 | Brown et al. | |
| 2007/0166122 A1 | 7/2007 | McDuff et al. | |

FOREIGN PATENT DOCUMENTS

| | | |
|---|---|---|
| DE | 20100991 | 4/2001 |
| EP | 0560517 | 9/1993 |
| EP | 1026412 | 8/2000 |
| GB | 1065578 | 4/1967 |
| GB | 2053072 | 2/1981 |
| JP | 51001709 | 1/1986 |
| JP | 52017414 | 1/1987 |
| JP | 10288212 | 10/1998 |

* cited by examiner

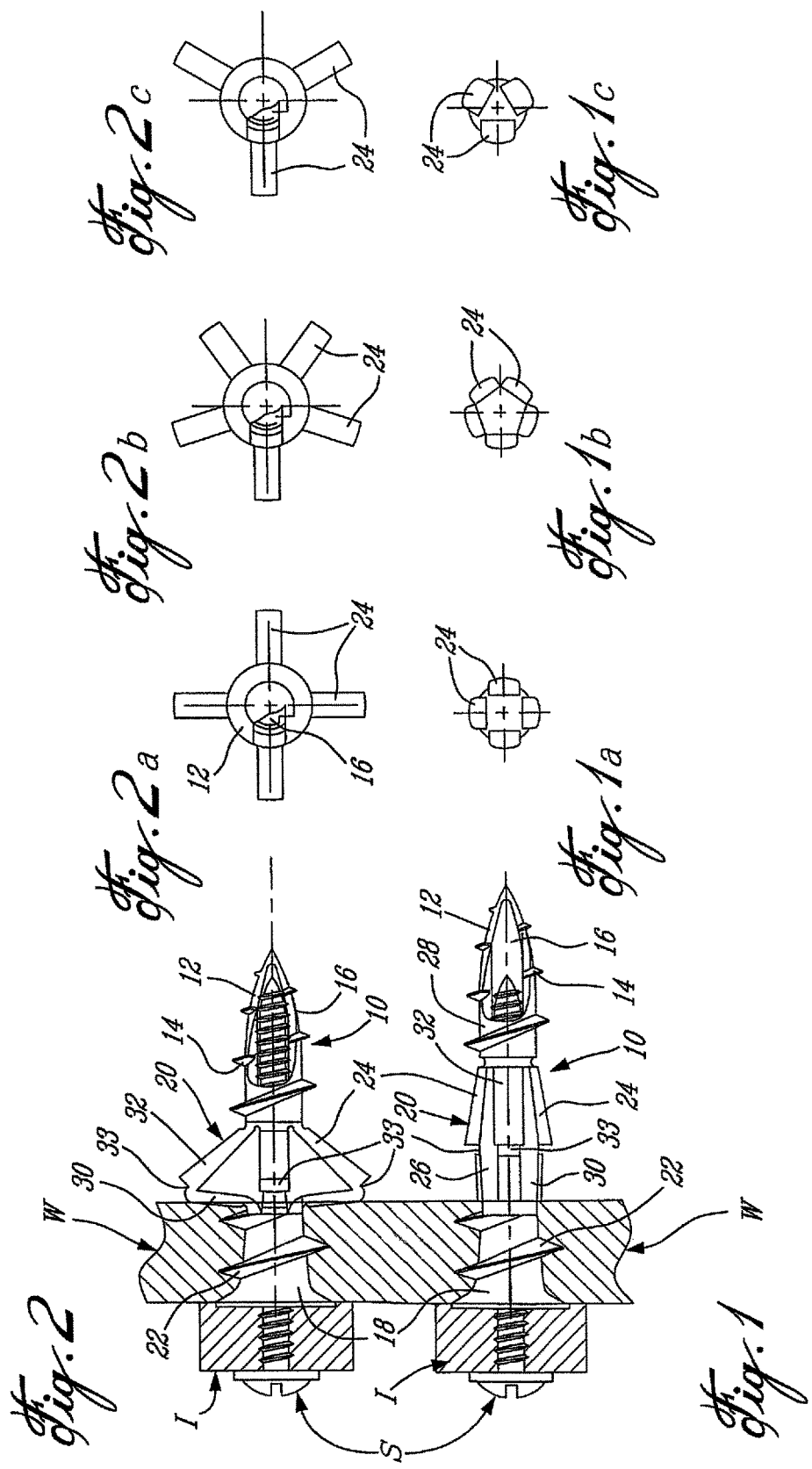

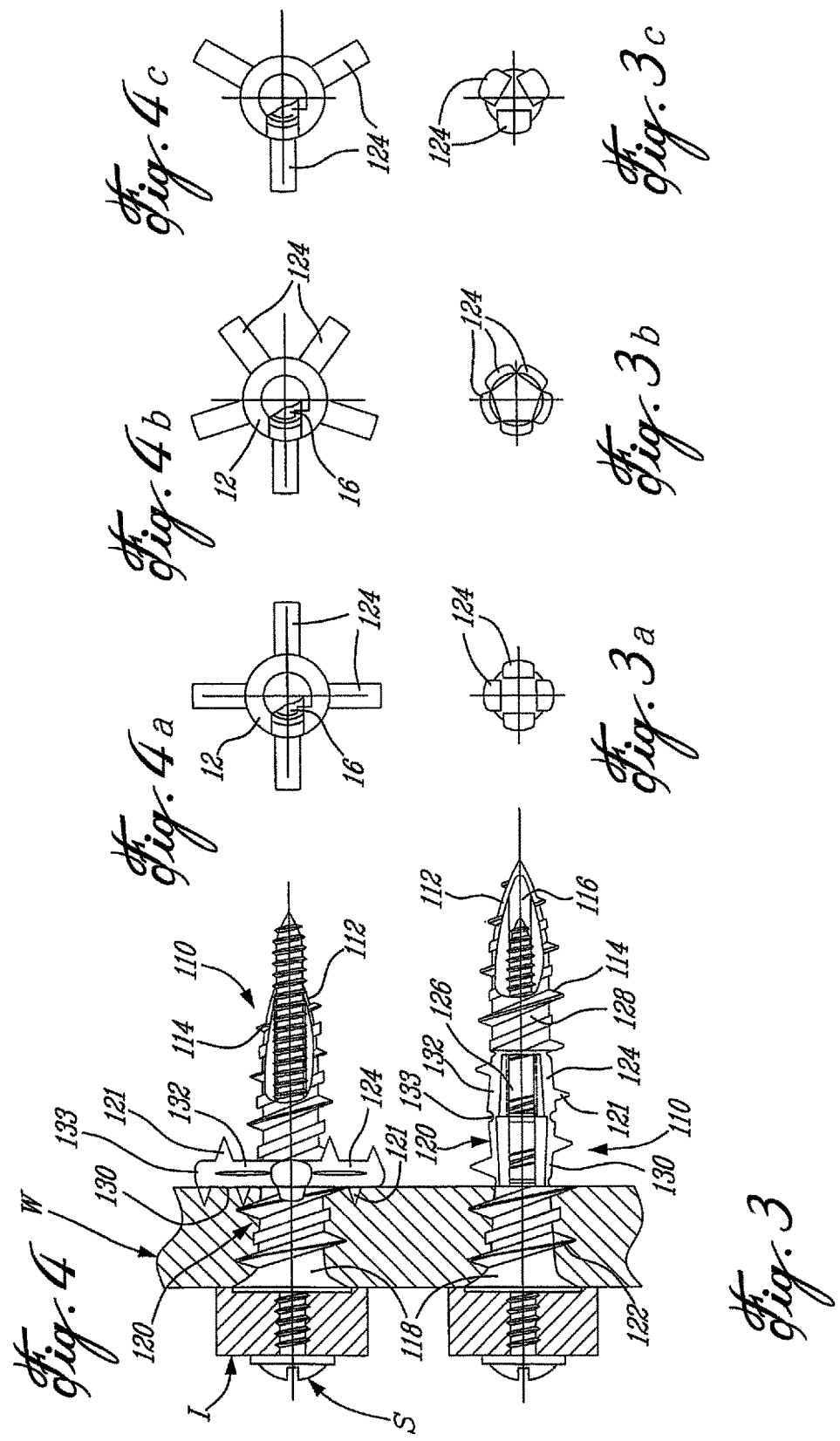

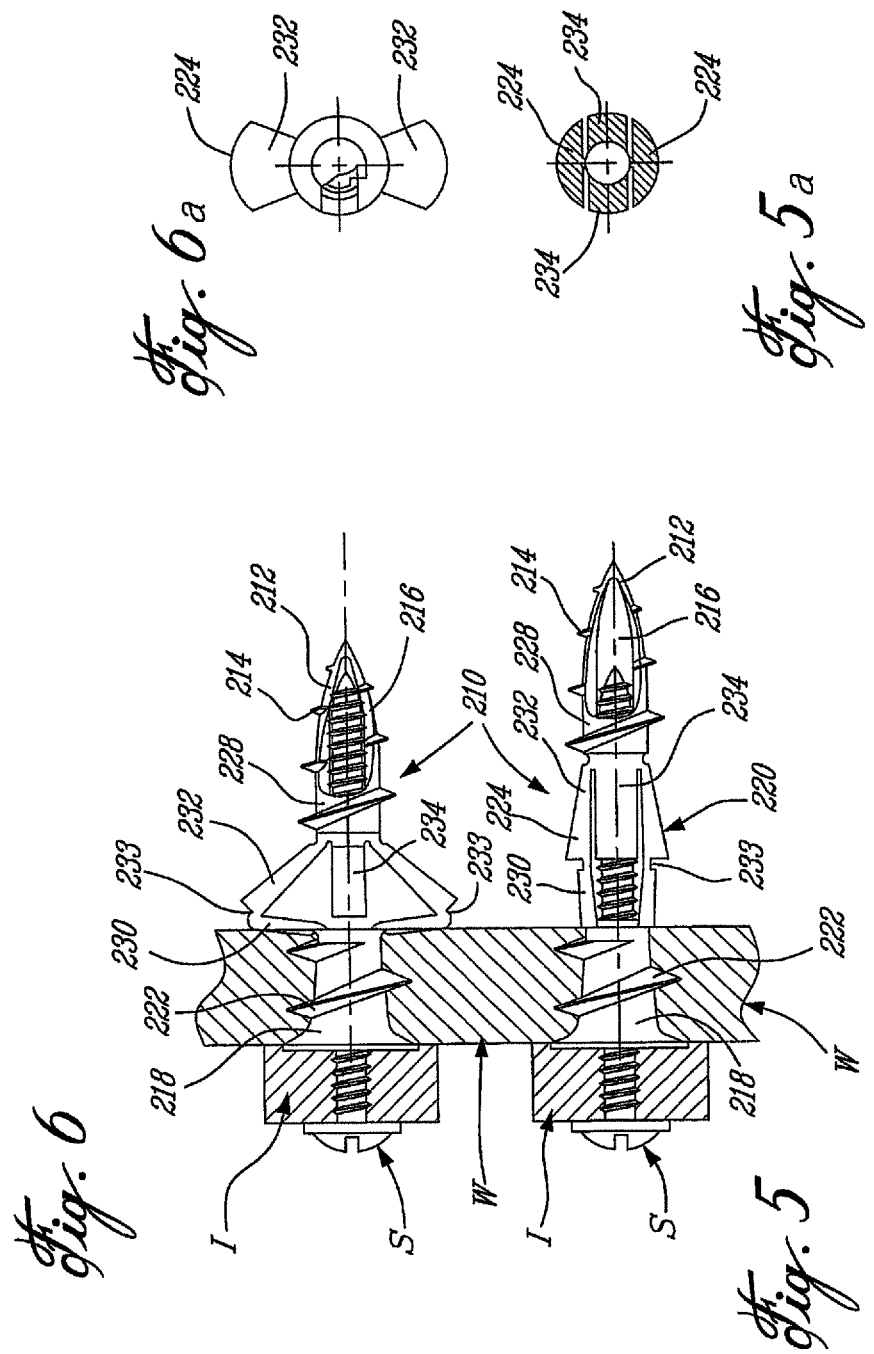

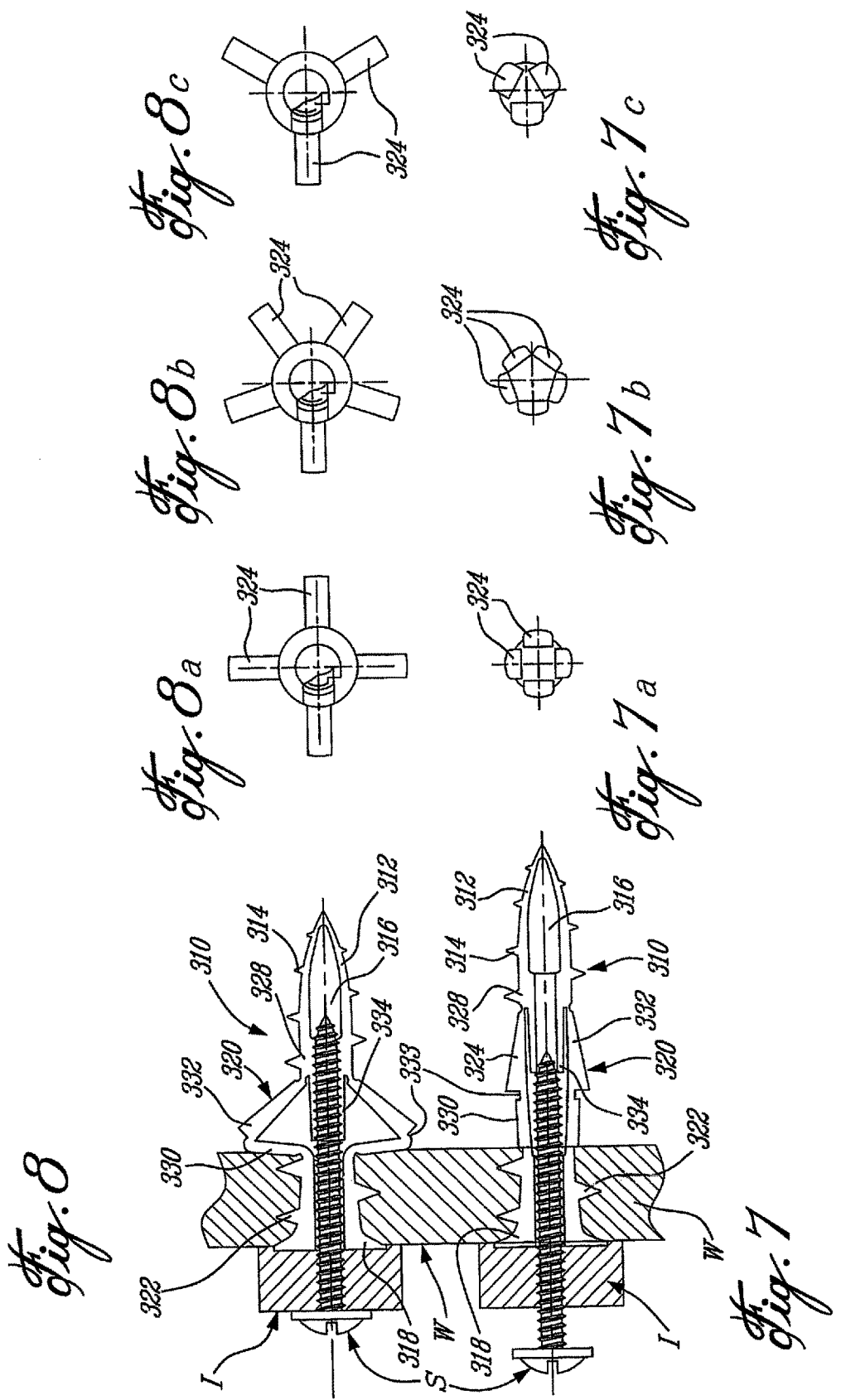

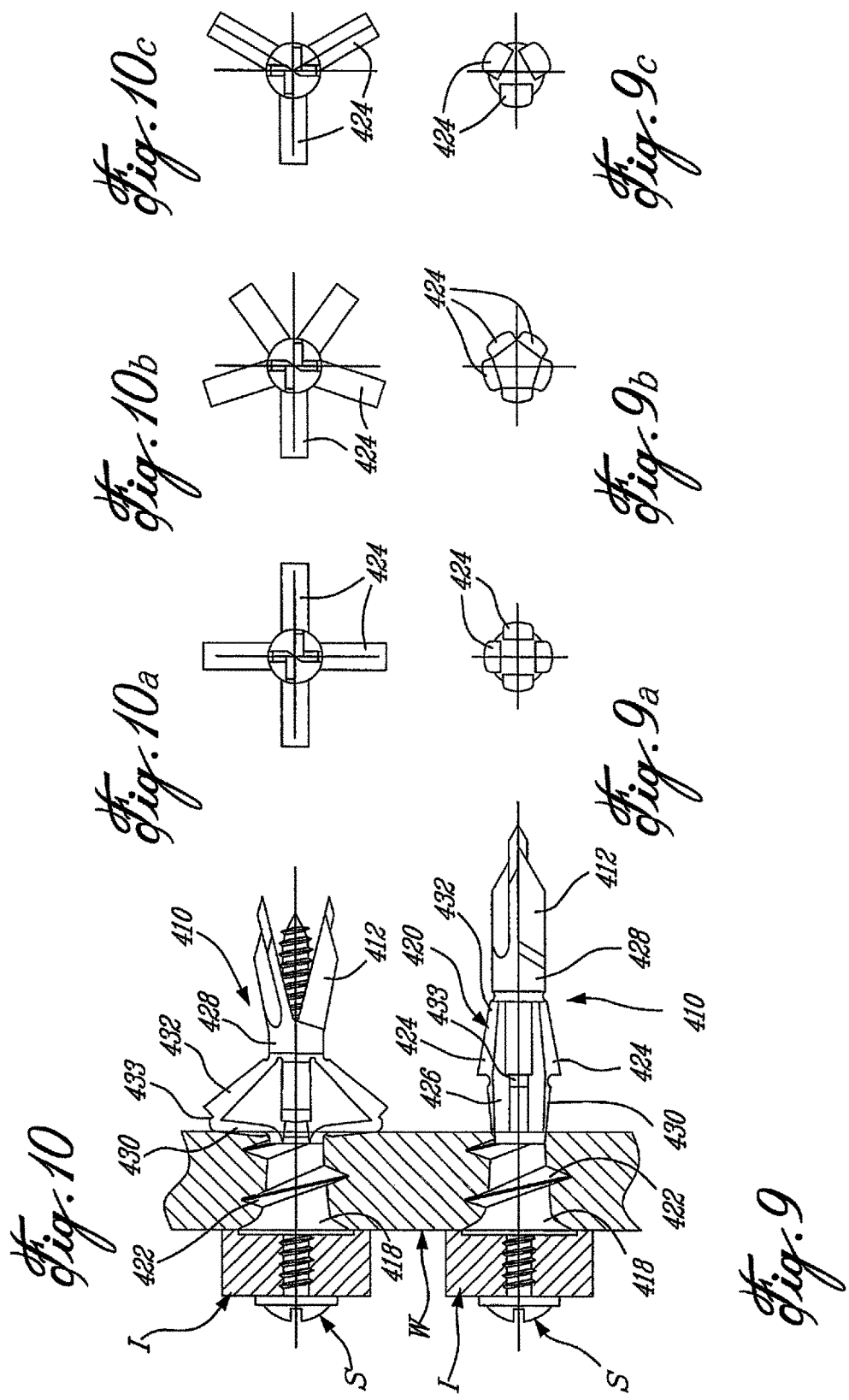

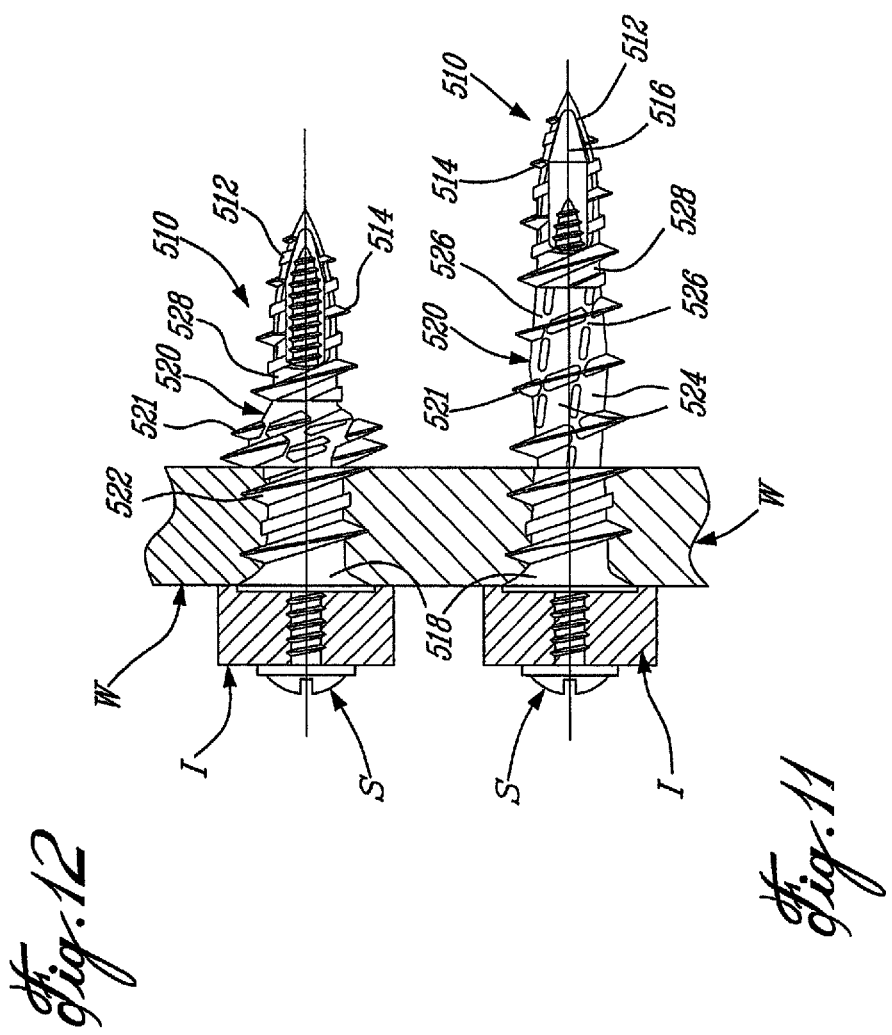

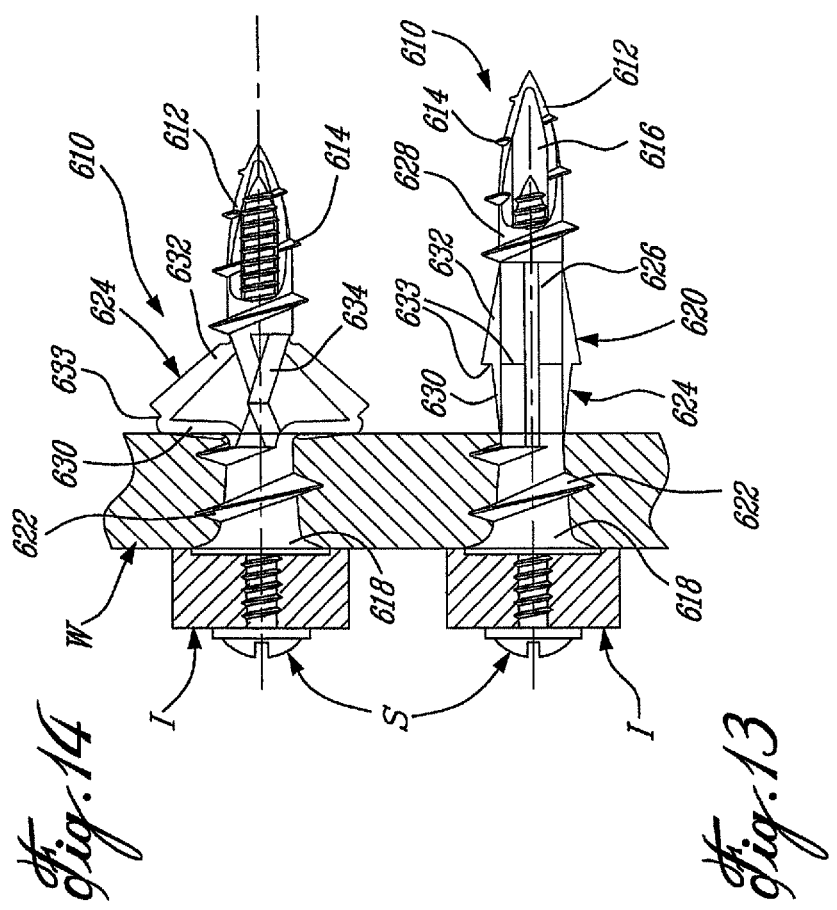

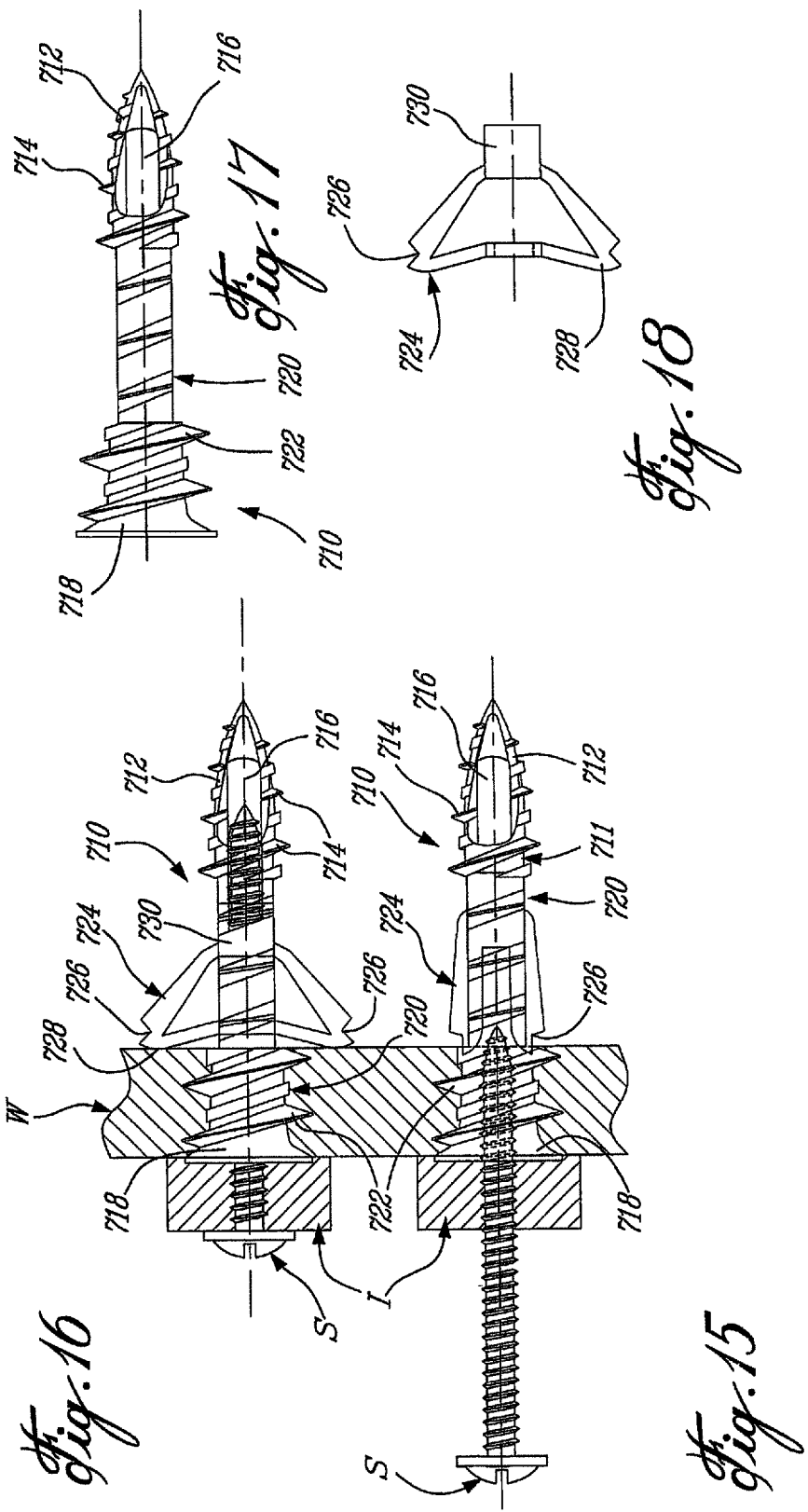

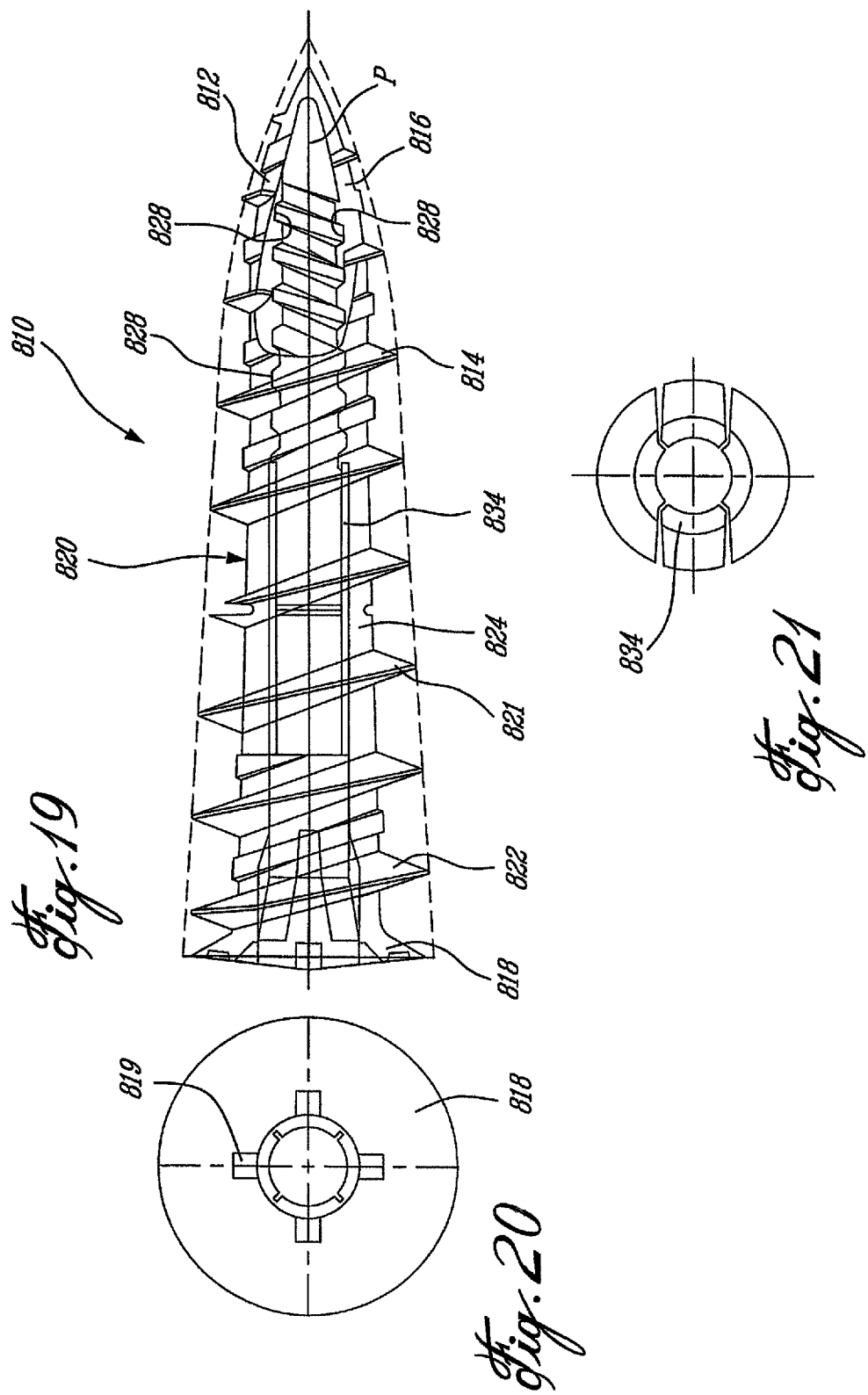

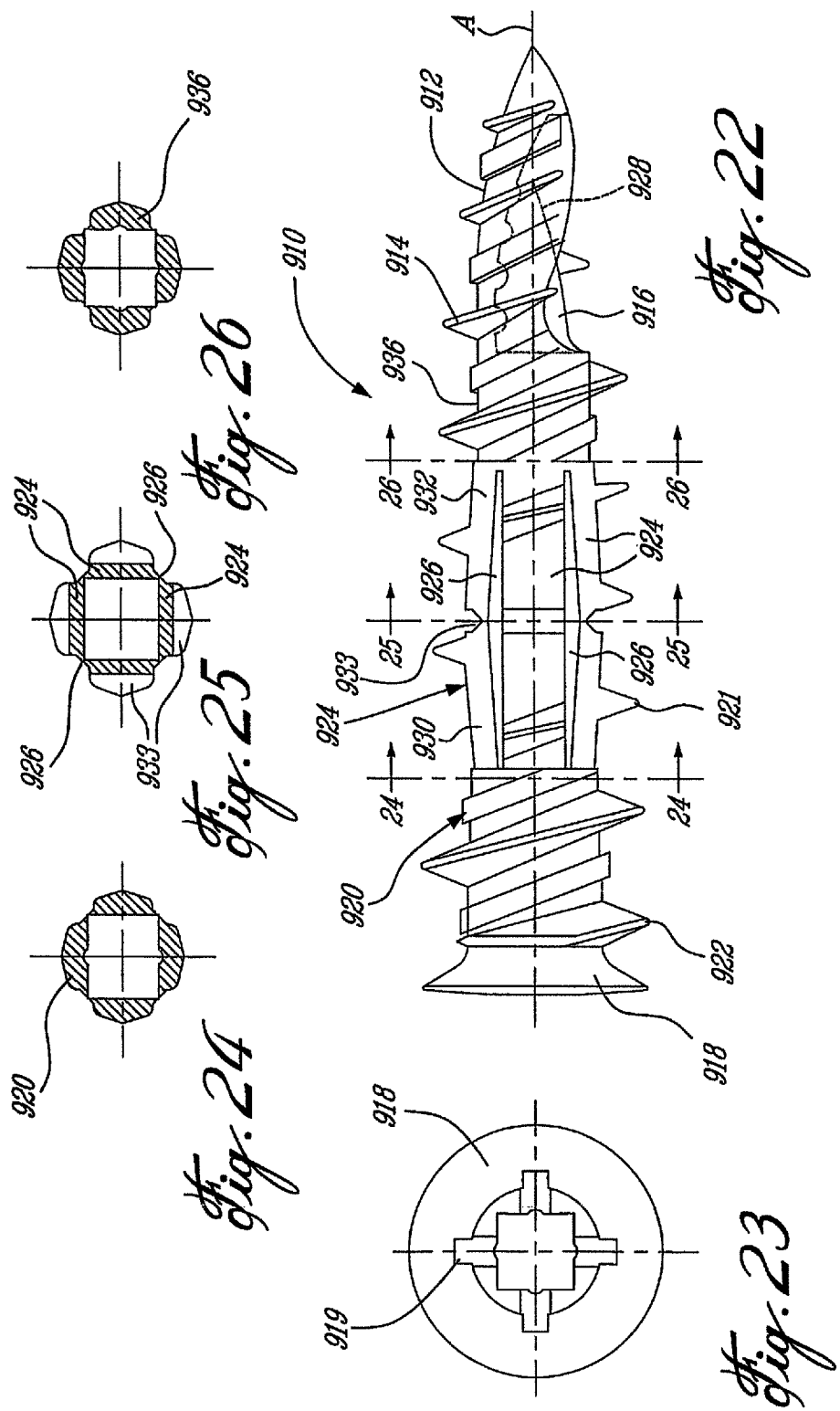

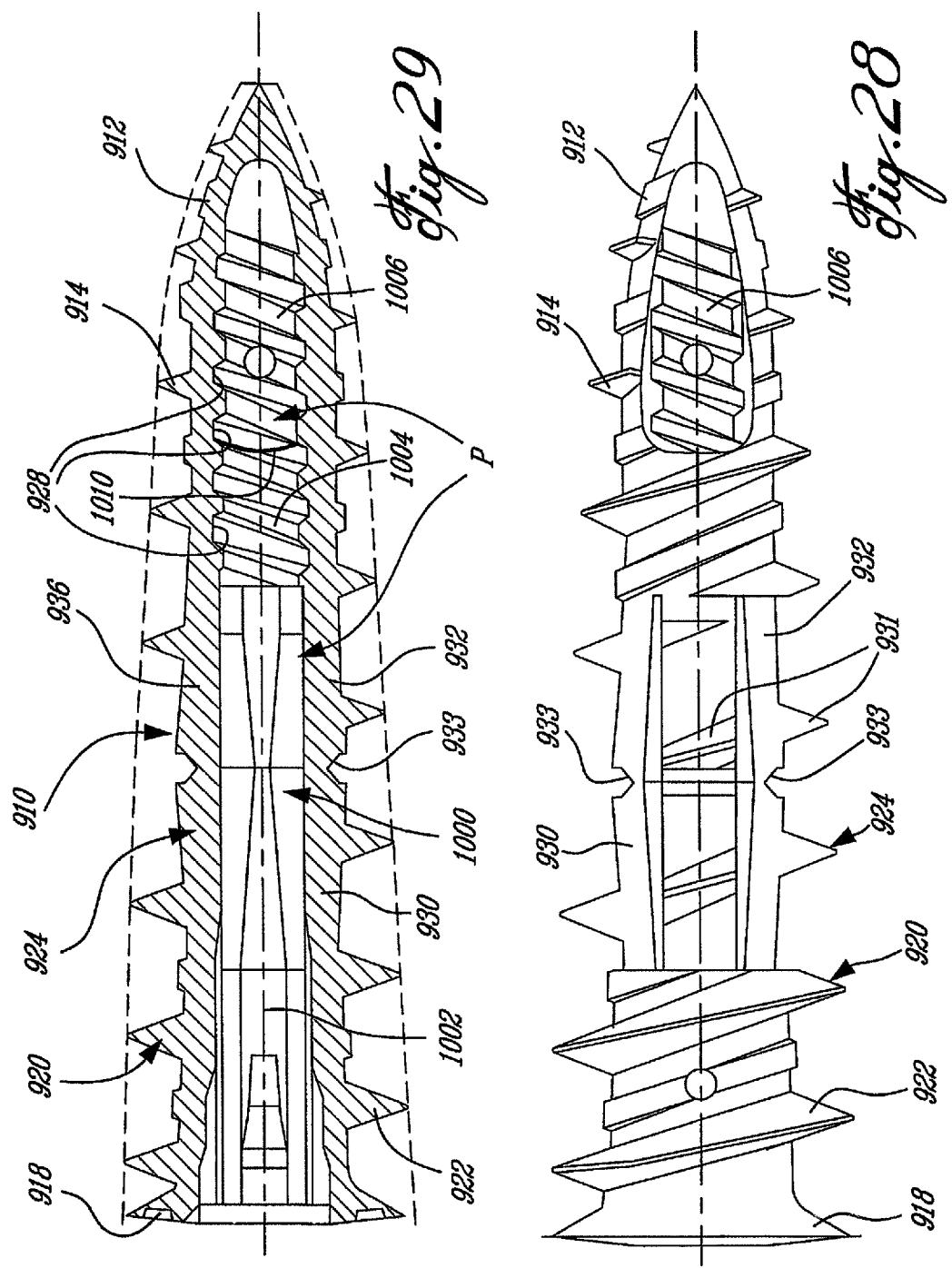

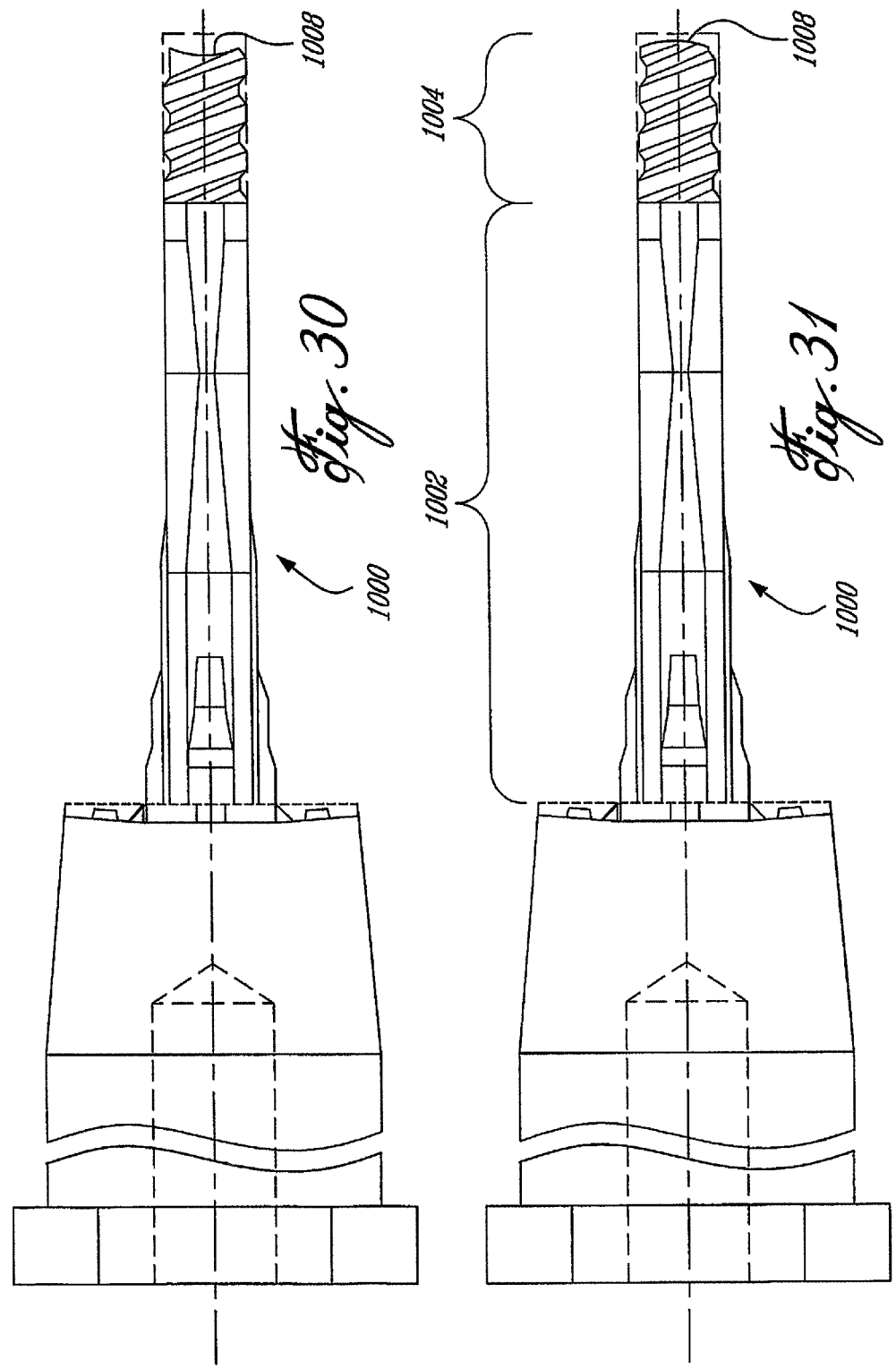

ANCHOR FOR HOLLOW WALLS

CROSS REFERENCE TO RELATED APPLICATIONS

This Non-provisional Application is a continuation of U.S. Non-provisional application Ser. No. 12/693,976, entitled "ANCHOR FOR HOLLOW WALLS," filed on Jan. 26, 2010 and issued as U.S. Pat. No. 9,353,782, which is a division of U.S. Non-provisional application Ser. No. 10/538,451, entitled "ANCHOR FOR HOLLOW WALLS," filed on Jun. 10, 2005 and issued as U.S. Pat. No. 7,654,781, which is a National Stage Entry of International Application No. PCT/CA03/02041, filed on Dec. 11, 2003, which claims priority to U.S. Provisional Application No. 60/435,369, filed Dec. 23, 2002, the entireties of which are incorporated herein by reference.

BACKGROUND OF THE INVENTION

1. Field of the Invention

The present invention relates to wall anchors and, more particularly, to self-drilling anchors for use typically in hollow walls made of friable materials, e.g. plasterboard, gypsum, etc.

2. Description of the Prior Art

The Ernst et al, Gianuzzi and McSherry U.S. Pat. Nos. 4,601,625, 5,234,299 and 5,529,449, respectively, each disclose an anchor which is turned in a wall made of friable material and is retained in the wall by virtue of the friable material being compressed between the root and deep thread spiraled along the cylindrical body of the anchor and between the proximal end of the thread and flanged end of the anchor which becomes embedded in the front surface of the wall. A work piece is then fastened to the wall by a screw fastener that is screwed into the visible open end of the anchor and holds the workpiece between the flanged end of the anchor and the head of the screw fastener.

Toggle bolts are also known, such as in U.S. Pat. No. 6,435,789 issued on Aug. 20, 2002 to Gaudron. Generally a self-drilling toggle anchor includes a drilling member and a toggle member. The drilling member is adapted to drill through the wall hole with the toggle member in its retracted position, i.e. extending axially along the drilling member, whereby the whole anchor is inserted longitudinally in the wall with the toggle member being located completely behind the wall. The toggle member defines a threaded opening that extends transversally therethrough and that has, in the retracted position of the toggle member, its axis perpendicular to the drilling member and to the longitudinal orientation of the whole anchor when it drilled into the wall. In a second step, a screw is rotatably inserted in the anchor and, at one point, a tip of the screw engages the toggle-member and causes it to pivot an extended position thereof, wherein the toggle member extends at right angles to the drilling member and to the general orientation of the anchor. The screw then engages the threaded opening of the toggle member. Once the head of the screw abuts the front of the wall or the head of the anchor, it cannot displace longitudinally, such that further rotation of the screw draws the toggle member translationally towards the head of the screw and thus towards the rear face of the wall until is abuts firmly the same, whereby the anchor is fixed to the wall. Alternatively, the drilling tip can be provided on the toggle member, and in such cases the above drilling member remains similar in that it fixedly depends from the anchor head but it does not perform the drilling action. Such designs are somewhat costly, as the anchor requires two distinct components (e.g. the above drilling and toggle members) that also must be assembled together.

SUMMARY OF THE INVENTION

It is therefore an aim of the present invention to provide an improved anchor adapted to be securely mounted to a hollow wall such that an item can be attached thereto, e.g. via an elongated fastener engaged in the anchor.

Therefore, in accordance with the present invention, there is provided an anchor for mounting to a hollow wall, comprising a proximal end adapted to be engaged by a rotatable tool to rotate said anchor about a longitudinal axis thereof and to cause it to gradually engage a wall, a distal end adapted to cut through the wall as said anchor is rotated, and a shank between said proximal and distal ends, said shank including at least one expandable leg, said expandable leg being in a collapsed position thereof when said anchor is rotated to mount it to the wall and being located distally past a rear surface of the wall once said anchor is mounted to the wall, said anchor including outer threads, said anchor being adapted to receive therein a threaded fastener and to threadably engage the same distally of said leg such that sufficient rotation of the threaded fastener retracts said distal end towards said proximal end thereby causing said leg to displace to a laterally expanded position thereof.

Also in accordance with the present invention, there is provided an anchor assembly for mounting to a hollow wall, comprising a threaded fastener and an anchor; said anchor including a proximal end adapted to be engaged by a rotatable tool to rotate said anchor about a longitudinal axis thereof and to cause it to gradually engage a wall, a distal end adapted to cut through the wall as said anchor is rotated, and a shank between said proximal and distal ends, said shank including at least one expandable leg, said expandable leg being in a collapsed position thereof when said anchor is rotated to mount it to the wall and being located distally past a rear surface of the wall once said anchor is mounted to the wall, said anchor including outer threads, said anchor being adapted to receive therein said threaded fastener and to threadably engage the same distally of said leg such that sufficient rotation of said threaded fastener retracts said distal end towards said proximal end thereby causing said leg to displace to a laterally expanded position thereof Further in accordance with the present invention, there is provided an anchor for mounting to a hollow wall, comprising a proximal end adapted to be engaged by a rotatable tool to rotate said anchor about a longitudinal axis thereof and to cause it to gradually engage a wall, a distal end and a shank between said proximal and distal ends, said shank including at least one expandable means, said expandable means being in a collapsed position thereof when said anchor is rotated to mount it to the wall, said anchor including outer threads, said anchor being adapted to receive therein a threaded fastener and to threadably engage the same distally of said expandable means such that sufficient rotation of the threaded fastener retracts said distal end towards said proximal end thereby causing said expandable means to displace to a laterally expanded position thereof behind the wall.

Still further in accordance with the present invention, there is provided a method for mounting an anchor to a hollow wall, comprising the steps of:

a) providing a hollow anchor including outer threads and having a proximal end, a distal end and a shank between said proximal and distal ends;

b) installing said anchor in a wall; and c) rotatably driving a threaded fastener in said anchor such that said threaded fastener engages distal end and causes, once said fastener cannot further advance translationally in said anchor, said distal end to retract towards said proximal end thereby deforming said shank such that said shank laterally expands behind the wall.

Still further in accordance with the present invention, there is provided a method for forming inner threads in a hollow anchor adapted for a hollow wall, comprising the steps of:

a) providing a core pin having outside threads thereon;

b) molding an anchor in a mold with said core pin therein such that said core pin is at least partly surrounded by plastic; and c) translationally removing said core pin, without substantially rotating it, from the molded anchor without stripping the female threads formed by said core pin in said anchor.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a schematic side view, partly in cross section, showing a first wall anchor in accordance with the present invention, engaged into a wall and in a collapsed position thereof;

FIG. 1a is an end view of the wall anchor of FIG. 1;

FIGS. 1b and 1c are end views of variants of the wall anchor of FIGS. 1 and 1a;

FIG. 2 is a schematic side view, partly in cross section, that is similar to FIG. 1, but shows the wall anchor of FIG. 1 in an expanded position thereof;

FIG. 2a is an end view of the wall anchor of FIG. 2;

FIGS. 2b and 2c show the variants of FIGS. 1b and 1c in the second position of the wall anchor;

FIG. 3 is a schematic side view, partly in cross section, of a second wall anchor in accordance with the present invention, which is similar to FIG. 1 and which is shown in a collapsed position thereof;

FIGS. 3a to 3c are similar to FIGS. 1a to 1c, but pertain to the wall anchor of FIG. 3;

FIGS. 4 and 4a to 4c are similar to FIGS. 2 and 2a to 2c, but pertain to the second wall anchor of FIG. 3 that is shown in an expanded position thereof;

FIG. 5 is a schematic side view, partly in cross section, of a third wall anchor in accordance with the present invention, shown in a collapsed position thereof;

FIG. 5a is an end view of the wall anchor of FIG. 5;

FIG. 6 is a schematic side view, partly in cross section, of the wall anchor of FIG. 5, but showing the wall anchor in an expanded position thereof;

FIG. 6a is an end view of the wall anchor of FIG. 6;

FIGS. 7 and 7a to 7c are similar to FIGS. 1 and 1a to 1c, but show a fourth wall anchor in accordance with the present invention and in a collapsed position thereof, with FIG. 7 being a cross-sectional view;

FIGS. 8 and 8a to 8c are similar to FIGS. 2 and 2a to 2c, but pertain to the wall anchor of FIG. 7 that is shown in an expanded position thereof, with FIG. 7 being a cross-sectional view;

FIGS. 9 and 9a to 9c are similar to FIGS. 1 and 1a and 1c, but show a fifth wall anchor in accordance with the present invention and in a collapsed position thereof;

FIGS. 10 and 10a to 10c are similar to FIGS. 2 and 2a to 2c, but pertain to the wall anchor of FIG. 9 that is shown in an expanded position thereof;

FIG. 11 is a schematic side view, partly in cross section, of a sixth wall anchor in accordance with the present invention, shown in a collapsed position thereof;

FIG. 12 is a view similar to FIG. 11, but shows the sixth wall anchor in an expanded position thereof;

FIG. 13 is a side view, partly in cross section, that is similar to FIG. 1, but shows a seventh wall anchor in accordance with the present invention and in a collapsed position thereof;

FIG. 14 is a side view, partly in cross section, of the wall anchor of FIG. 13, but in an expanded position thereof;

FIG. 15 is a side view, partly in cross section, of an eighth wall anchor in accordance with the present invention, shown in a collapsed position thereof;

FIG. 16 is a side view, partly in cross section, of the wall anchor of FIG. 15, but shown in an expanded position thereof;

FIG. 17 is a side view of an anchor section of the wall anchor of FIG. 15;

FIG. 18 is a side view of a locking member of the wall anchor of FIG. 15;

FIG. 19 is a schematic side view of a ninth wall anchor in accordance with the present invention, also shown being a molding pin used in the manufacture of the ninth anchor;

FIG. 20 is an end view of the wall anchor of FIG. 19;

FIG. 21 is a cross-sectional view of the wall anchor of FIG. 19;

FIG. 22 is a side view of a tenth wall anchor, similar to that of FIG. 3, and also in accordance with the present invention;

FIG. 23 is an end view of the tenth anchor of FIG. 22;

FIGS. 24, 25 and 26 are cross-sectional views taken respectively along lines 24-24, 25-25 and 26-26 of FIG. 22;

FIGS. 28 and 29 are respectively a side view and a longitudinal cross-sectional view of the tenth anchor of FIG. 23 provided with a core pin therein that is used during the molding thereof;

FIGS. 30 and 31 are respectively a side view and a partly cross-sectional view of part of the core pin.

DESCRIPTION OF THE PREFERRED EMBODIMENTS

Figure 27A:
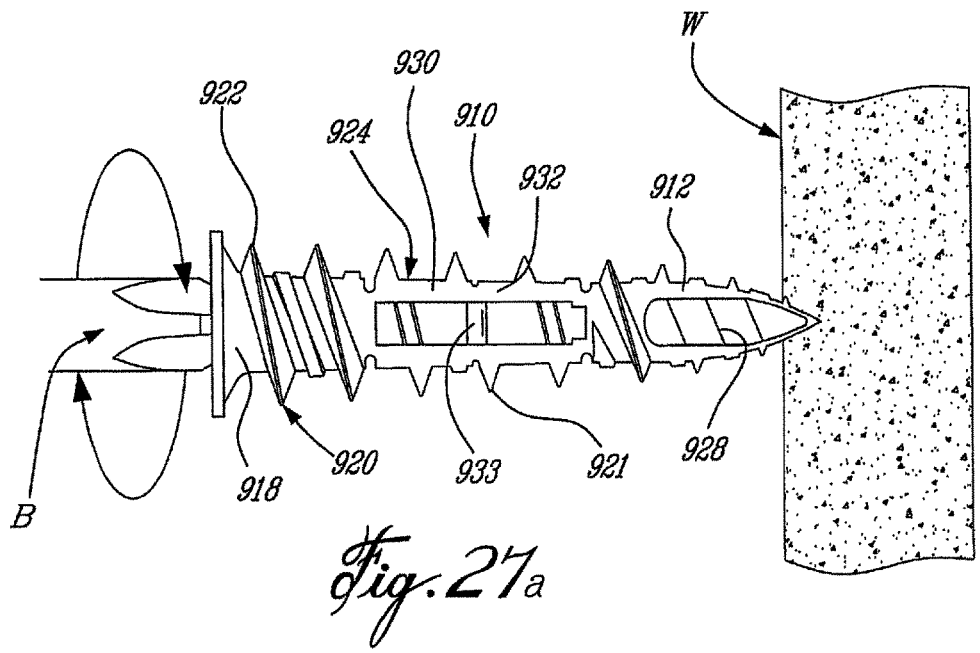
FIGS. 27a to 27d are successive partly cross-sectional side views showing the installation of the tenth anchor of FIG. 23 into a wall.

In accordance with the present invention, FIG. 1 illustrates a wall anchor 10 in its first, i.e. insertion, position, with FIG. 1 showing the wall anchor 10 fully inserted through a wall W and with a screw S engaged in the wall anchor 10 and holding an item I against the wall W. In FIG. 2, the wall anchor 10 is shown in a second, i.e. expanded, position thereof wherein the wall anchor 10 is further secured to the wall W, as explained in details hereinafter. The wall anchors described herein are generally all made of plastics material, e.g. nylon.

The wall anchor 10 is hollow, for receiving the screw S therein, and comprises a pointed distal tip 12 provided with a partial thread 14 therearound and defining an opening 16. Proximally, the wall anchor 10 includes a head 18 and, between the head 18 and the distal tip 12, the wall anchor 10 comprises a shank 20. The proximal portion of the shank 20 includes a thread 22 and, between the threads 14 and 22, the shank 20 includes a system of expandable legs 24. In the embodiment shown in FIGS. 1 and 2, the shank 20 includes four such legs 24 which, in the collapsed position of FIG. 1, are linked together by frangible films 26, although such films can be absent, in which case the legs 24 extend along side each other but are not connected together.

The head 18 can be engaged by a torque driven rotational tool, such as a screwdriver, manual or powered. For instance, the head 18 can define a cruciform recess (see reference 819 in FIGS. 20 and 919 in FIG. 23) for receiving a Phillips-type screwdriver bit. This allows the wall anchor 10 to be rotatably driven, as a screw, through the wall W, with the distal tip 12 assisting in penetrating the wall 10 and with the threads 14 and 22 consecutively engaging the friable material of the wall W and, in fact, tapping the same such that the wall anchor 10 is secured to the wall by way of the threads 22. The opening 16 assists in evacuating the friable material that has been removed from the wall W by the wall anchor 10. Once the wall anchor 10 is in its position shown in FIG. 1 with respect to the wall W, the screw S, with or without the item I located between the head of the screw S and the front or visible surface of the wall W, is rotatably engaged into the wall anchor 10 until it assumes its position shown in FIG. 1.

Once the head of the screw S cannot further axially translationally advance (in FIG. 1 because of its abutment with the item I, or alternatively because it has engaged the head 18, or even the visible surface of the wall W), further rotation of the screw S causes the distal tip 12 of the wall anchor 10 to be pulled towards the wall W in view of the threaded engagement between the screw S and the wall anchor 10, typically at section 28 thereof that has been tapped by the screw S (although female threads may alternatively have been formed by molding within the section 28). The gradual retraction of the distal tip 12 towards the head 18 causes the legs 24 to outwardly expand and, initially, any frangible film 26 between adjacent legs 24 is ruptured.

Each leg 24 has a shorter proximal portion 30 and a longer distal portion 32 that connect at pivot 33. The expansion of the legs 24 is interrupted by the proximal leg portions 30 abutting the rear or non-visible surface of the wall W, as seen in FIG. 2, in which position the proximal and distal leg portions 30 and 32 form with the screw S a substantially right angled triangle.

Additionally, the shank 20, for instance inwardly of (i.e. within) the legs 24, may include a stopper which, for example, extends around the screw S and which extends rearwardly from a proximal end of the distal tip 12 (examples of stoppers are shown at 234 and 334 of the further embodiments of FIGS. 5 and 6 and FIGS. 7 and 8, respectively). Such a stopper does not extend the full length of the legs 24 when they are in their collapsed position of FIG. 1, such that a proximal end of the stopper engages, in FIG. 2, the non-visible surface of the wall W inwardly of the proximal leg portions 30 of the legs 24 and/or the inner ends of the proximal leg portions 30, thereby significantly impeding further retraction of the distal tip 12 towards the wall W. Even though the proximal leg portions 30, when they engage the non-visible surface of the wall W, offer resistance to such a further retraction of the distal tip 12, over-rotation of the screw S could cause the proximal leg portions 30 to dig into the wall W. With the stopper, which is of a length which substantially correspond to the third side of the right angled triangle that has the proximal and distal leg portions 30 and 32 as its two other sides, it is ensured that the end position of the wall anchor 10 will be that illustrated in FIG. 2. In other words, the proximal leg portions 30 and/or the stopper will substantially prevent the screw S from being over-rotated.

FIGS. 1b, 2b, 1c and 2c show alternate shanks which, instead of having four legs 24 as in FIGS. 1 and 2, have five and three such legs, respectively. Other numbers of legs can also be contemplated.

FIGS. 3 and 4 illustrate a second wall anchor 110, also in accordance with the present invention, which is similar to the first wall anchor 10, except that a shank 120 of the wall anchor 110 includes a thread 121 therearound that is substantially continuous with the threads 114 and 122. Also, in the wall anchor 110, the proximal and distal leg portions 130 and 132 of the legs 124 thereof are of a same length such that they assume the general flattened end position shown in FIG. 4, with the threads 121 of the proximal leg portion 130 engaging the non-visible surface of the wall W. In FIGS. 3 and 4, the screw S that is illustrated has a larger pitch wood-type thread that makes the installation of the screw S (including the expansion of the wall anchor 110) faster, i.e. with less rotations being required from the screw S. As for the first wall anchor 10, the second wall anchor 110 includes a distal tip 112, an opening 116, a head 118 and a tapped section 128, and can also include frangible films 126, such as frangible films 26 of the first wall anchor 10.

FIGS. 3b, 4b, 3c and 4c show variations of the wall anchor 110, i.e. with five and three legs instead of the four legs 124 shown in FIGS. 3 and 4.

As a variant to the second wall anchor 110 (and possibly also to other wall anchors, e.g. to the first wall anchor 10), the section 128 of the shank 120 can include a metal insert provided with inner threads (i.e. it does not need to be tapped by the screw S) and mounted, for instance molded, into the plastic shank 120 of the wall anchor 110, the inner threads of such a metal insert (which acts as a nut) being typically adapted to receive a machine screw.

FIGS. 5 and 6 illustrate a third wall anchor 210, which is somewhat similar to the first wall anchor 10, except that it includes only two, diametrically opposed, legs 224. A pair of stoppers 234 are part of the shank 220 and extend between the legs 24 and rearwardly from a proximal end of the distal tip 212. The proximal ends of the stoppers 234 are adapted to limit the retraction of the distal tip 212 towards the head 218 such that the wall anchor 210 assumes, in its final position, the general configuration shown in FIG. 6.

The wall anchor 210 further includes a distal thread 214, a distal opening 216, a proximal thread 222, a tapped section 228 and proximal and distal leg portions 230 and 232.

FIGS. 7 and 8 illustrate a fourth wall anchor 310 in which a stopper 334 takes the form of a cylinder that extends rearwardly from the distal tip 312 and within the legs 324. The stopper 334 can take the form, as illustrated, of a rearward extension of the tapped section 328 such that it is also tapped by the screw S. The number of legs 324 in the shank 320 can vary, as seen for instance in FIGS. 7a and 8a, 7b and 8b, and 7c and 8c where four, five and three legs are illustrated, respectively.

The fourth wall anchor 310 also includes a distal thread 314, a distal opening 316, a proximal head 318, a proximal thread 322 and proximal and distal leg portions 330 and 332. Frangible sections can also be provided between adjacent legs 324, as in the first wall anchor 10 of FIGS. 1 and 2.

FIGS. 9 and 10 illustrate a fifth wall anchor 410 also in accordance with the present invention, which is similar to the first wall anchor 10 of FIGS. 1 and 2, but which shows a variant distal tip 412 that is based on the distal section of the self-drilling anchor of aforementioned U.S. Pat. No.

5,234,299. The distal tip 412 of the wall anchor 410 could also take the shape of the blade of the self-drilling threaded insert of aforementioned U.S. Pat. No. 4,601,625. In fact, these variant distal tips as well as others can be contemplated for the various wall anchors disclosed herein.

With the illustrated distal tip 412, the wall anchor 410 is initially punched through the wall W before being rotated such that the proximal threads 422 thereof engage the wall W. The wall anchor 410 also includes a head 418, a shank 420, legs 424, frangible films 426, a tapped section 428 and proximal and distal leg portions 430 and 432.

FIGS. 9a and 10a show the shank 420 having four legs 424 as in FIGS. 9 and 10, whereas FIGS. 9b, 10b, 9c and 10c show alternate leg configurations consisting of five and three legs 424.

In FIGS. 11 and 12, a sixth wall anchor 510 is shown, wherein a shank 520 includes side-by-side legs 524 which are slightly angled with respect to a longitudinal axis of the wall anchor 510 and in a direction that is opposite the torque exerted when the wall anchor 510 is rotatably inserted in the wall W in order to provide added rigidity to the shank 520 during the rotary installation of the wall anchor 510. The legs 524 are detachably connected together by way of frangible portions 526 which, as in previous embodiments, provide additional rigidity to the shank when compared to legs that are not initially connected together. The shank 520, as the shank 120 of FIGS. 3 and 4, includes a thread 521 that provides with the proximal thread 522 and the distal thread 514 a substantially continuous thread. Once expanded, as seen in FIG. 12, the wall anchor 510 defines a bundle that is in abutment with the non-visible surface of the wall W, this bundle being formed by the deformed legs 524.

The sixth wall anchor 510 also includes a distal tip 512, a distal opening 516, a proximal head 518 and a tapped section 528.

FIGS. 13 and 14 show a seventh wall anchor 610 in accordance with the present invention, which is similar to the first wall anchor 10, except that two of its legs 624 expand inwardly, such legs being designated by reference numerals 634 in FIGS. 13 and 14. These inwardly deflecting legs 634 act as a stopper to resist further retraction of the distal tip 612 towards the wall W once the wall anchor 610 has generally assumed its second position shown in FIG. 14.

The wall anchor 610 also includes a distal thread 614, a distal opening 616, a head 618, a shank 620, a proximal thread 622, frangible films 626, a tapped section 628 and proximal and distal leg portions 630 and 632.

FIGS. 15 and 16 show an eighth wall anchor 710 in accordance with the present invention that consists of two separate components and, more particularly, of a threaded anchor section 711 (shown in isolation in FIG. 17) and an expandable locking member 724 (shown in isolation in FIG. 18). The anchor section 711 includes a distal tip 712, a distal thread 714, a distal opening 716, a proximal head 718, a shank 720, and a proximal thread 722.

The locking member 724 is initially collapsed, as seen in FIG. 15, being partly received in longitudinal grooves defined on diametrically opposed sides of the shank 720. The locking member 724 defines a pair of notches 726 that are adapted to engage a proximal end of the shank 720, when the locking member 724 is collapsed, wherein tips 728 defined by the notches 726 are held inwardly of the shank 720. The locking member 724 also includes a distal cylindrical member 730 that can be tapped by the screw S.

Once the screw S has been sufficiently inserted in the anchor section 711, it contacts the locking member 724 and displaces it axially away from the head 718 thereby disengaging the tips 728 of the locking member 724 from the shank 720 of the anchor section 711. As the locking member 724 is spring loaded, its release from the shank 720 causes it to automatically deploy to its position shown in FIG. 18. The cylindrical member 730 of the locking member 724 is then tapped by the screw S and with subsequent rotation of the screw S, the locking member 724 is retracted towards the wall W until it assumes the position shown in FIG. 16. In fact, the locking member 724 basically acts as a toggle that is displaced between a collapsed idle insertion position (FIG. 15) and a wall engaging expanded position (FIG. 16).

The locking member 724 is inserted by the manufacturer of the wall anchor 710 through the central bore of the anchor section 711, from the head 718 towards the distal tip 712, that is until the collapsed locking member 724 extends partly in the longitudinal grooves of the shank 720 while the tips 728 of the locking member 724 are prevented from expanding by the proximal end of the shank 722. Again, once the screw S has been sufficiently inserted, it axially moves the locking member 724 along the bore of the anchor section 711 until the tips 728 are disengaged from the shank 720 and are spring biased exteriorly through the longitudinal grooves of the shank 720.

FIGS. 19 and 20 illustrate a ninth wall anchor 810 in accordance with the present invention, which is characterized by having inside threads 828 defined in the distal end of the shank 820 and, interruptingly, in the open distal end 812. The threads 828 defined in the shank 820 are continuous, but the inside threads 828 defined in the distal tip 812 are interrupted by the distal opening 816. The inside threads 828 of the wall anchor 810 are obviously adapted to be engaged by the outside threads of the screw S (not illustrated). This configuration provides more threads in the wall anchor 810 that can be engaged by the threads of the screw S thereby providing more strength at the level of the engagement of the screw S with the wall anchor 810, which thus prevents stripping of the threads 828 of wall anchor 810 when the screw S is further rotated in order to retract the distal tip 812 rearwardly towards the wall for expanding the legs 824 provided on the shank 820.

A pin P is located in the anchor 810 and is used during the molding process to define the female inside threads 128. The structure of this pin P and how it is used will be described in details hereinafter.

The wall anchor 810 also includes a distal thread 814, a proximal head 818, a proximal thread 822, and a thread 821 around the legs 824 so as to provide, with the threads 814 and 822, a continuous outside male thread (although interrupted at the distal opening 816). A tube 834 is provided in the shank 820 of the wall anchor 810 to provide more rigidity when the wall anchor 810 is installed in the wall.

FIGS. 22 to 26 show a tenth wall anchor 910 in accordance with the present invention, which is similar to that of FIG. 3 although the wall anchor 910 includes an inner thread 928 (as in FIG. 19) located interruptingly inside the distal tip 912 and un-interrruptingly within a cylindrical section 936 that extends axially between a distal end of the shank 920 and a proximal end of the distal tip 912. This inner thread 928 is adapted to be engaged by the thread of the screw S upon rotation thereof, and once the screw S is prevented from further advancing into the anchor 910 (e.g. because it has abutted item I or the head 918 of the anchor 910), further rotation of the screw S causes the distal tip 912 to be axially and translationally drawn towards the head 918 thereby causing the deformation (i.e. outward expansion) of the legs 924 onto the hidden face of the wall W. A longitudinal axis of the anchor 910 is denoted by "A", and such an axis characterizes each of the anchors described herein.

The provision of female threads 128 both in the cylindrical section 936 and in the distal tip 912 increases the overall female thread length that can be engaged by the threads of the screw S thereby providing more strength at the level of the engagement of the screw S with the wall anchor 910, which thus prevents stripping of the threads 928 of wall anchor 910 when the screw S is further rotated in order to retract the distal tip 912 rearwardly towards the wall for expanding the legs 924 provided on the shank 920.

Figure 27B:
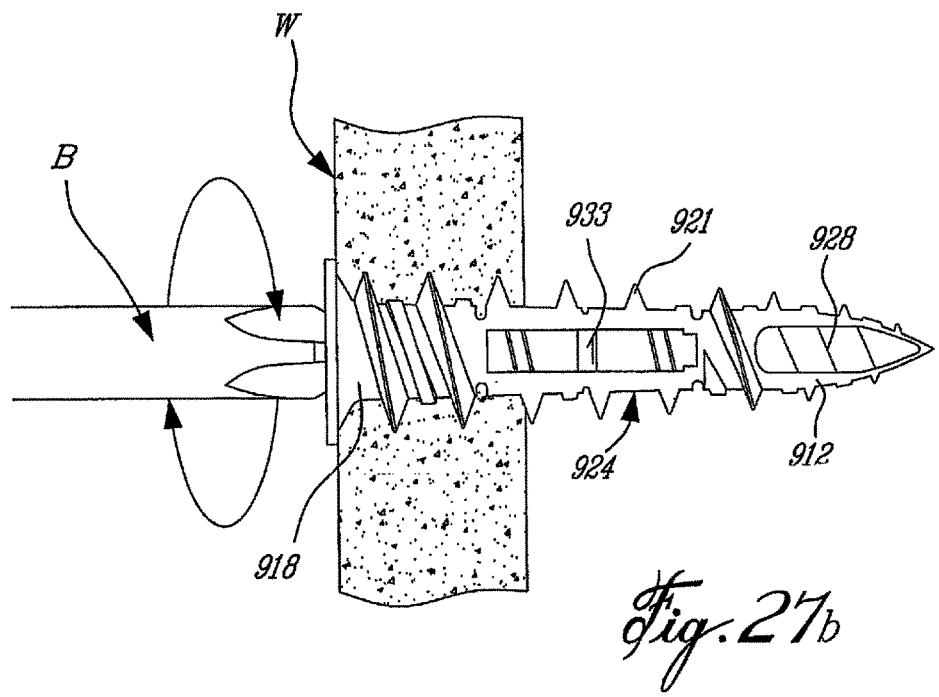
Figure 27C:
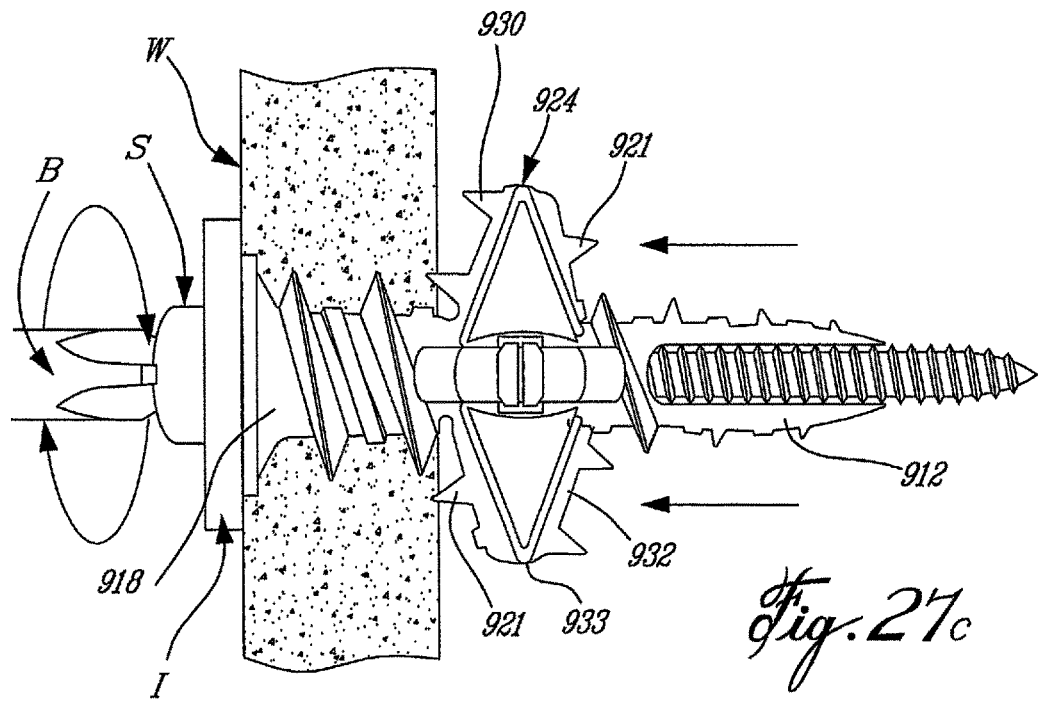
Figure 27D:
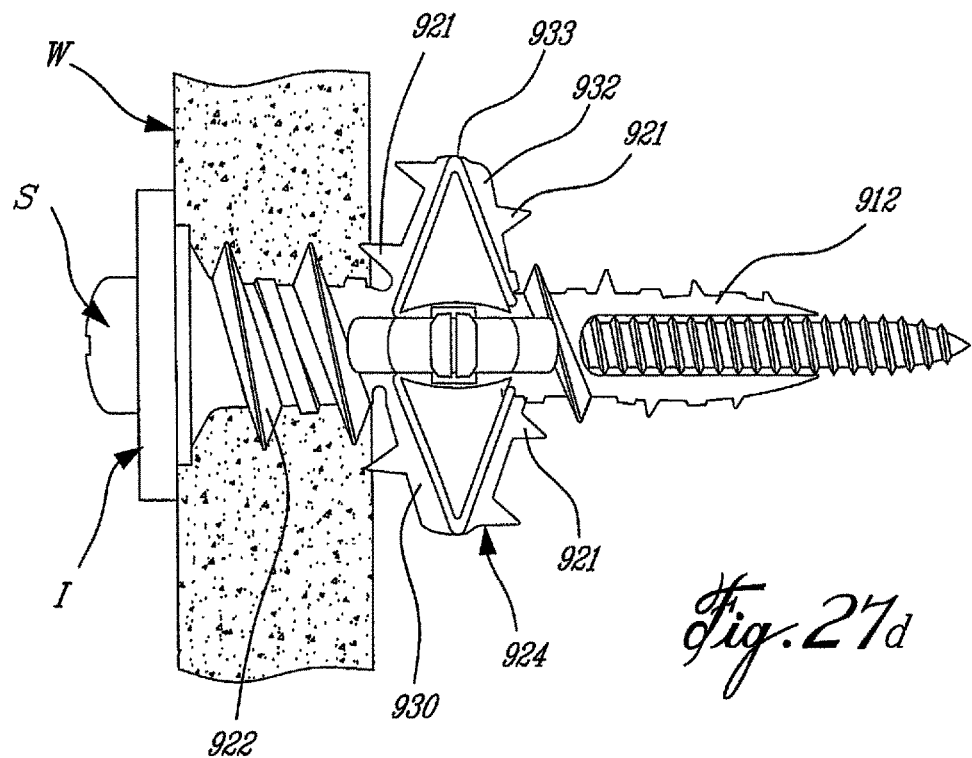

FIGS. 27a to 27d illustrate the installation sequence of the present anchors and will now be described with reference to the tenth wall anchor 910. As seen in FIG. 27a, the wall anchor 910 is positioned with its distal tip 12 against the visible side of the wall W, and it is rotatably engaged therein using an appropriate torque-inducing tool, such as a screwdriver, having a bit formed to fit in the recess defined in the head 918 of the anchor 910. Here, a Phillips-type screwdriver bit B is used to fit into the cruciform recess 919. The anchor 910 is rotated until its head 918 abuts the visible side of the wall W, as seen in FIG. 27b. The screw S is then rotatably engaged in the wall anchor 910 using the screwdriver bit B and the screw translationally advance into the wall W until it reaches its position shown in FIG. 3, whereat it is prevented from further advancing by the item I thinly abutting the wall W. As explained above and as seen in FIG. 27c, subsequent further rotation of the screw S causes, in view of the male threads of the screw S being engaged with the female threads 928 of the anchor 910, the distal tip 912 to be axially and translationally drawn towards the head 918, thereby causing the deformation (i.e. outward expansion) of the legs 924 onto the hidden face of the wall W and firmly securing the anchor 910 to the wall W. As seen in FIG. 27d, such a deformation results in some of the threads 921, provided around the arms 924, engaging (e.g. piercing into) the hidden face of the wall W.

FIGS. 28 and 29 illustrate the tenth anchor 912 of FIG. 23 with a core pin P therein that is used during the molding thereof to form the through passage extending axially through the anchor 910, including the inner threads 928 thereof. More particularly, the core pin P includes a main pin section 1000 (also shown in isolation in FIGS. 30 and 31) that has a first portion 1002 adapted to form the inside of the head 918, of the expandable legs 924 and of the part of the shank 920 that extends between the head 918 and the expandable legs 924, and a second portion 1004 adapted to form the female threads 128 of the cylindrical section 936. The core pin P also includes a secondary pin section 1006 that is adapted to form the threads 928 located in the distal tip 912 of the anchor 910. A distal end 1008 of the second portion 1004 of the main pin section 1000 is shaped so as to mate with a proximal end 1010 of the secondary pin section 1006, and this ensures the alignment of the main pin section 1000 and the secondary pin section 1006, and thus a female thread 128 that is substantially uninterrupted at a junction of where it was formed by the main pin section 1000 and where it was formed by the secondary pin section 1006, and that has a constant pitch.

The mold also includes two outer mold sections that will provide the shape to the outside of the anchor 910, and once the plastic has been injected in the mold, the main pin section 1000 is pulled out axially and translationally from the mold, while the secondary pin section 1006 is removed laterally from the distal end 912, i.e. through the opening 916 thereof. It is noted that the main pin section 1000 is pulled out from the mold during a specified period after the injection process, such that the main pin section 1000 does not strip the female threads 128 that is has molded, these female threads completely solidifying after the main pin section 1000 has been so removed. In the prior techniques, the pin would be rotatably removed from the molded anchor, which is much more time consuming than the present translational withdrawal thereof.

The embodiments of the invention in which an exclusive property or privilege is claimed are defined as follows:

1. An anchor for mounting to a hollow wall, comprising a proximal end adapted to be engaged by a rotatable tool to rotate said anchor about a longitudinal axis thereof and to cause it to gradually engage a wall, a distal end adapted to cut through the wall as said anchor is rotated, and a shank between said proximal and distal ends, said shank including at least one expandable leg, said expandable leg being in a collapsed position thereof when said anchor is rotated to mount it to the wall and being located distally past a rear surface of the wall once said anchor is mounted to the wall, said anchor including outer threads, said anchor being adapted to receive therein a threaded fastener and to threadably engage the threaded fastener distally of said leg such that sufficient rotation of the threaded fastener retracts said distal end towards said proximal end thereby causing said leg to displace to a laterally expanded position thereof, and wherein said outer threads include a first outer thread provided around said leg.

2. An anchor as defined in claim 1, wherein said shank comprises, distally of said leg, a tubular section defining a first inner thread adapted to be threadably engaged by the threaded fastener.

3. An anchor as defined in claim 2, wherein said distal end defines a second inner thread adapted to be threadably engaged by the threaded fastener.

4. An anchor as defined in claim 3, wherein said first and second inner threads are substantially continuous and have a same pitch.

5. An anchor as defined in claim 1, wherein said outer threads include a second outer thread provided on said shank between said proximal end and said leg and engaged in the wall when said anchor is in said first position.

6. An anchor as defined in claim 5, wherein said outer threads include a third outer thread provided between said leg and said distal end.

7. An anchor as defined in claim 6, wherein said shank comprises, distally of said leg, a tubular section adapted to be threadably engaged by the threaded fastener, said third outer thread being provided around said tubular section.

8. An anchor as defined in claim 6, wherein said first, second and third outer threads having a same pitch.

9. An anchor as defined in claim 6, wherein there are provided at least two said legs adapted to extend in different directions in said expanded position, said first outer thread extending around all of said legs in said collapsed position.

10. An anchor as defined in claim 1, wherein said proximal end comprises a flanged head defining a recess for engageably receiving the rotatable tool.

11. An anchor as defined in claim 1, wherein there are provided at least two said legs, said legs extending substantially parallelly in said collapsed position.

12. An anchor as defined in claim 11, wherein said legs are connected together in said collapsed position by frangible elements adapted to rupture when the threaded fastener draws said distal end towards said proximal end, thereby allowing said legs to deploy to said expanded position.

13. An anchor for mounting to a hollow wall, comprising a proximal end adapted to be engaged by a rotatable tool to rotate said anchor about a longitudinal axis thereof and to cause it to gradually engage a wall, a distal end and a shank between said proximal and distal ends, said shank including at least one expandable leg, said expandable leg being in a collapsed position thereof when said anchor is rotated to mount it to the wall, said anchor including an outer thread provided around said leg, said anchor being adapted to receive therein a threaded fastener and to threadably engage the threaded fastener distally of said expandable leg such that sufficient rotation of the threaded fastener retracts said distal end towards said proximal end thereby causing said expandable leg to displace to a laterally expanded position thereof behind the wall.

14. An anchor for mounting to a hollow wall, comprising a proximal end adapted to be engaged by a rotatable tool to rotate said anchor about a longitudinal axis thereof and to cause it to gradually engage a wall, a distal end adapted to cut through the wall as said anchor is rotated, and a shank between said proximal and distal ends, said shank including at least one expandable leg, said expandable leg being in a collapsed position thereof when said anchor is rotated to mount it to the wall and being located distally past a rear surface of the wall once said anchor is mounted to the wall, said anchor including outer threads, said anchor being adapted to receive therein a threaded fastener and to threadably engage the threaded fastener distally of said leg such that sufficient rotation of the threaded fastener retracts said distal end towards said proximal end thereby causing said leg to displace to a laterally expanded position thereof, wherein said outer threads include a first outer thread provided around said leg.

15. An anchor as defined in claim 14, wherein said outer threads include a second outer thread provided between said leg and said distal end.

16. An anchor as defined in claim 15, wherein said first and second outer threads have a substantially same pitch.

17. An anchor as defined in claim 15, wherein said outer threads include a third outer thread provided on said shank between said proximal end and said leg and engaged in the wall when said anchor is in said expanded position.

18. An anchor as defined in claim 17, wherein said first, second and third outer threads have a substantially same pitch.

19. An anchor as defined in claim 15, wherein said shank comprises, distally of said leg, a tubular section adapted to be threadably engaged by the threaded fastener, said second outer thread being provided around said tubular section.

20. An anchor as defined in claim 14, wherein there are provided at least two said legs adapted to extend in different directions in said expanded position, said first outer thread extending around all of said legs in said collapsed position.

* * * * *